US011410198B2

(12) United States Patent
Tanabe et al.

(10) Patent No.: US 11,410,198 B2
(45) Date of Patent: Aug. 9, 2022

(54) INFORMATION PROCESSING DEVICE AND METHOD FOR DISTRIBUTING INFORMATION OF A FACILITY THAT FACES A ROAD HAVING A PREDETERMINED TRAFFIC CAPACITY

(71) Applicants: TOYOTA JIDOSHA KABUSHIKI KAISHA, Toyota (JP); Hitachi Solutions, Ltd., Tokyo (JP)

(72) Inventors: Daisuke Tanabe, Nisshin (JP); Yuichiro Ueda, Chiryu (JP); Atsuko Kobayashi, Nagoya (JP); Akira Iijima, Nagoya (JP); Manabu Yamamoto, Toyota (JP); Hiroyuki Goto, Ichinomiya (JP)

(73) Assignees: TOYOTA JIDOSHA KABUSHIKI KAISHA, Toyota (JP); Hitachi Solutions, Ltd., Tokyo (JP)

( * ) Notice: Subject to any disclaimer, the term of this patent is extended or adjusted under 35 U.S.C. 154(b) by 236 days.

(21) Appl. No.: 16/778,982

(22) Filed: Jan. 31, 2020

(65) Prior Publication Data

US 2020/0258125 A1 Aug. 13, 2020

(30) Foreign Application Priority Data

Feb. 12, 2019 (JP) .............................. JP2019-022741

(51) Int. Cl.
G06Q 30/00 (2012.01)
G06Q 30/02 (2012.01)
(Continued)

(52) U.S. Cl.
CPC ..... *G06Q 30/0266* (2013.01); *G06Q 30/0259* (2013.01); *G08G 1/0129* (2013.01);
(Continued)

(58) Field of Classification Search
CPC .......... G06Q 30/2027–0277; H04W 4/021–27
See application file for complete search history.

(56) References Cited

U.S. PATENT DOCUMENTS

| 11,288,705 B2 * | 3/2022 | Hurley ..................... H04W 4/21 |
| 2012/0271717 A1 * | 10/2012 | Postrel ............... G06Q 30/0267 |
| | | 705/14.58 |

(Continued)

FOREIGN PATENT DOCUMENTS

| JP | 2007-263920 A | 10/2007 |
| JP | 2017-199122 A | 11/2017 |
| WO | WO-2014164829 A3 * | 1/2015 ............. B64C 19/00 |

*Primary Examiner* — Naresh Vig
(74) *Attorney, Agent, or Firm* — Sughrue Mion, PLLC

(57) ABSTRACT

An information processing device includes: a server transmitting and receiving unit configured to receive location information indicating a location of a vehicle from an on-board device mounted on the vehicle; and a server control unit configured to when the vehicle is traveling in an area that the vehicle has visited a predetermined number of times or less, extract a facility that faces a first road located within a predetermined range based on the location information and having traffic capacity equal to or larger than a predetermined threshold, wherein the server transmitting and receiving unit is configured to send advertisement information of the facility to the on-board device.

18 Claims, 6 Drawing Sheets

(51) Int. Cl.
*H04W 4/02* (2018.01)
*H04W 4/021* (2018.01)
*G08G 1/01* (2006.01)

(52) U.S. Cl.
CPC ........... *H04W 4/021* (2013.01); *H04W 4/023* (2013.01); *H04W 4/025* (2013.01)

(56) References Cited

U.S. PATENT DOCUMENTS

| | | | | |
|---|---|---|---|---|
| 2015/0032366 | A1* | 1/2015 | Man | H04W 4/024 |
| | | | | 701/412 |
| 2015/0142561 | A1* | 5/2015 | Gerard | G06Q 30/0261 |
| | | | | 705/14.53 |
| 2016/0323711 | A1* | 11/2016 | Spears | H04W 4/024 |
| 2021/0182993 | A1* | 6/2021 | Arian | G06Q 30/02 |

* cited by examiner

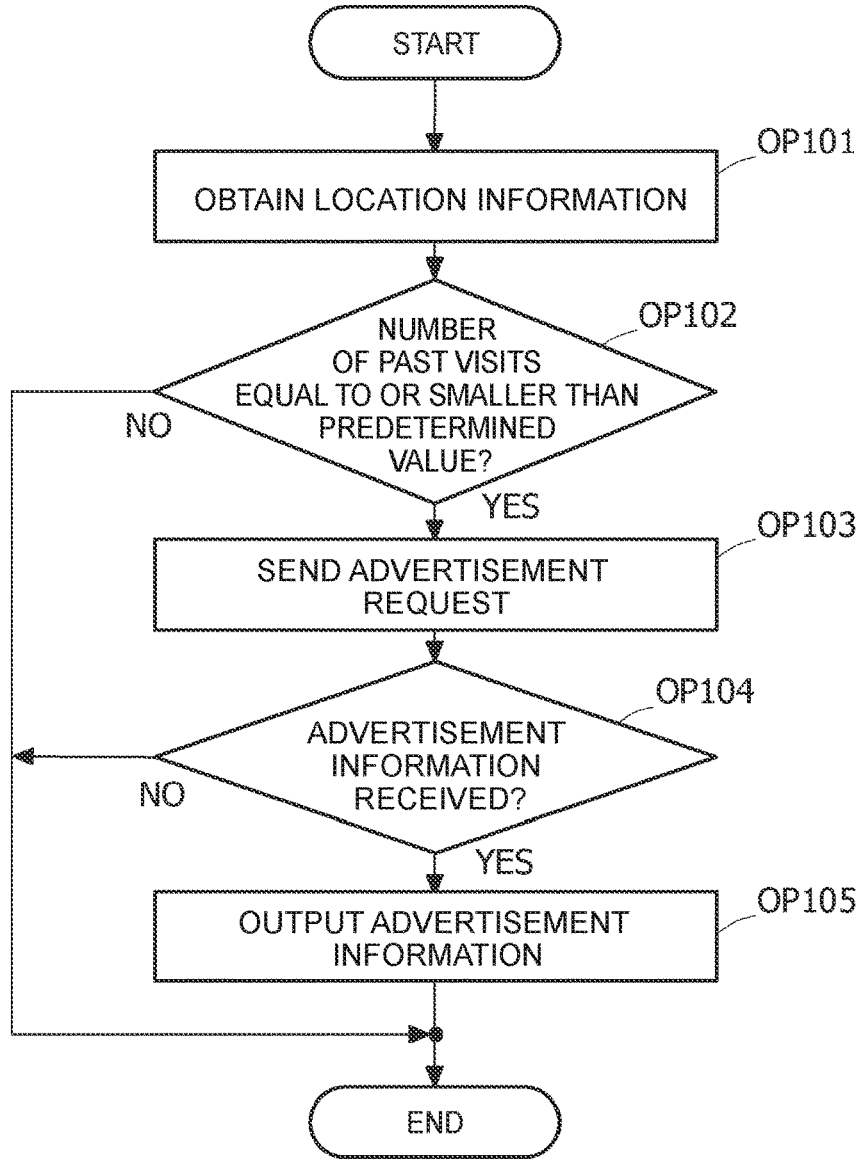

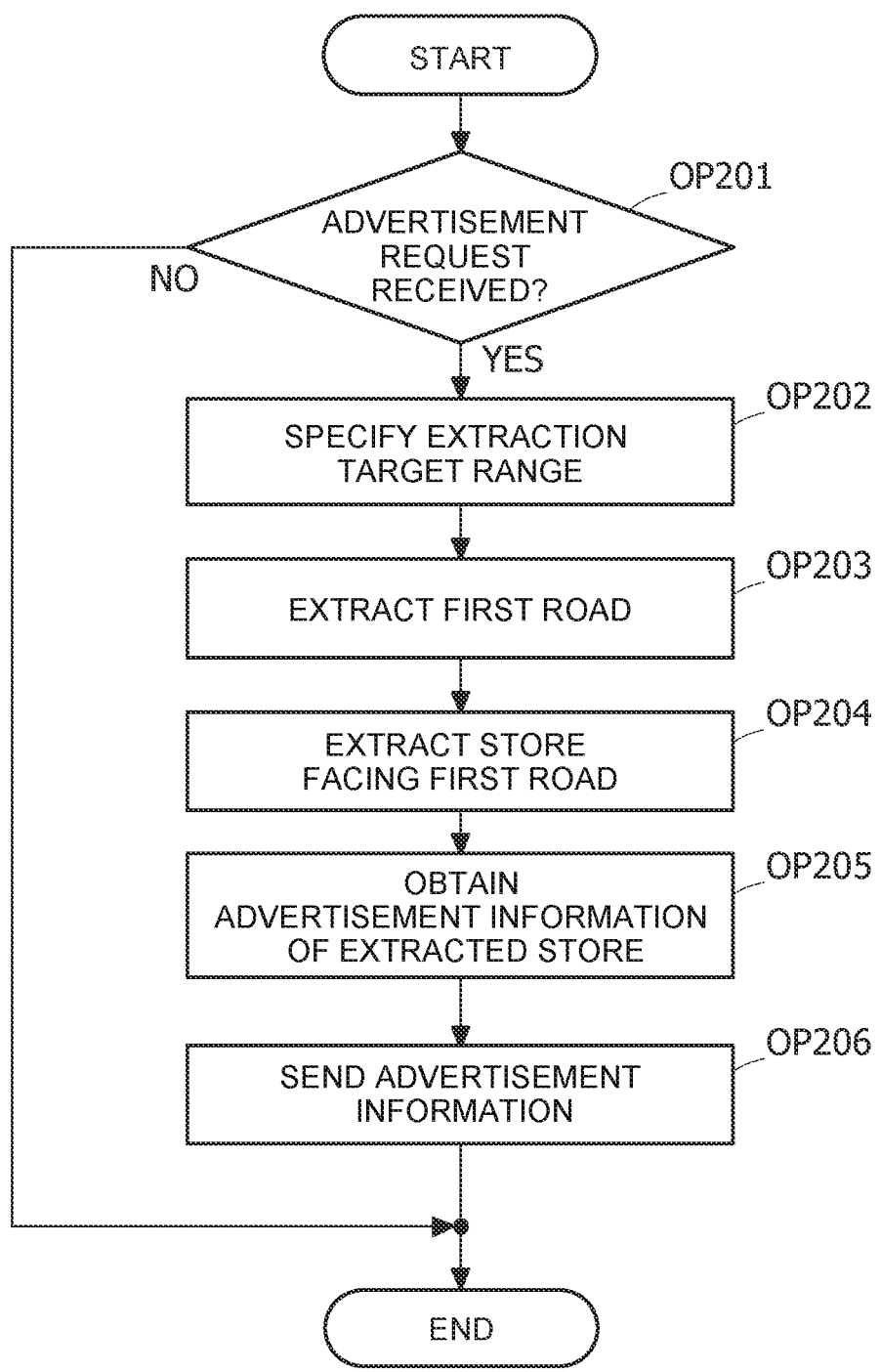

INFORMATION PROCESSING DEVICE AND METHOD FOR DISTRIBUTING INFORMATION OF A FACILITY THAT FACES A ROAD HAVING A PREDETERMINED TRAFFIC CAPACITY

INCORPORATION BY REFERENCE

The disclosure of Japanese Patent Application No. 2019-022741 filed on Feb. 12, 2019 including the specification, drawings and abstract is incorporated herein by reference in its entirety.

BACKGROUND

1. Technical Field

The disclosure relates to an information processing device, an on-board device, an information processing system, and an advertisement distribution method.

2. Description of Related Art

A distribution method is disclosed in which, when a request for store information on a store where a recording medium having viewing data recorded thereon is available is received from a navigation system, store information on a store where the recording medium is available is sent to the navigation system based on, e.g., the location indicated by location information received from the navigation system (e.g., Japanese Unexamined Patent Application Publication No. 2007-263920 (JP 2007-263920 A)).

SUMMARY

There are cases where users want to get information on facilities that meet their needs when they visit an unfamiliar area.

One of aspects of the disclosure provides an information processing device, an on-board device, an information processing system, and an advertisement distribution method which can distribute to a user who is visiting an unfamiliar area an advertisement that can more efficiently prompt the user to make a decision.

A first aspect of the disclosure provides an information processing device. The information processing device includes: a server transmitting and receiving unit configured to receive location information indicating a location of a vehicle from an on-board device mounted on the vehicle; and a server control unit configured to when the vehicle is traveling in an area that the vehicle has visited a predetermined number of times or less, extract a facility that faces a first road located within a predetermined range based on the location information and having traffic capacity equal to or larger than a predetermined threshold, wherein the server transmitting and receiving unit is configured to send advertisement information of the facility to the on-board device.

In the information processing device of the first aspect, the server control unit may be configured to, when the vehicle is traveling in the area, extract the facility located within the predetermined range based on the location information, the predetermined range being a range located within a predetermined distance from a current location of the vehicle.

In the information processing device of the first aspect, the traffic capacity may be determined based on at least one of a width of the first road, the number of lanes of the first road, and a measured number of vehicles that pass a given point on the first road per unit time.

The information processing device of the first aspect may further include a road information database that stores identification information of the first road and identification information of the facility in association with each other.

In the information processing device of the first aspect, the facility that faces the first road may include a facility having an entrance or a front door located on a first road side.

A second aspect of the disclosure provides an on-board device mounted on a vehicle. The on-board device includes: a control unit configured to obtain location information indicating a location of the vehicle; and a transmitting and receiving unit configured to when, based on the location information, the vehicle is traveling in an area that the vehicle has visited a predetermined number of times or less, send the location information to a predetermined information processing device, and receive, from the predetermined information processing device, advertisement information of a facility that faces a first road located within a predetermined range based on the location information and having traffic capacity equal to or larger than a predetermined threshold, wherein the control unit is configured to output the advertisement information to a predetermined display device in the vehicle.

In the on-board device of the second aspect, the control unit may be configured to receive the advertisement information of the facility located within the predetermined range based on the location information from the predetermined information processing device, the predetermined range being a range located within a predetermined distance from a current location of the vehicle.

In the on-board device of the second aspect, the traffic capacity may be determined based on at least one of a width of the first road, the number of lanes of the first road, and a measured number of vehicles that pass a given point on the first road per unit time.

In the on-board device of the second aspect, the information processing device may include a road information database that stores identification information of the first road and identification information of the facility in association with each other.

In the on-board device of the second aspect, the facility that faces the first road may include a facility having an entrance or a front door located on a first road side.

A third aspect of the disclosure provides an information processing system. The information processing system includes: an on-board device mounted on a vehicle configured to obtain location information indicating a location of the vehicle and send the location information when, based on the location information, the vehicle is traveling in an area that the vehicle has visited a predetermined number of times or less; and an information processing device configured to receive the location information indicating the location of the vehicle from the on-board device, extract a facility that faces a first road located within a predetermined range based on the location information and having traffic capacity equal to or larger than a predetermined threshold, and send advertisement information of the facility to the on-board device. The on-board device is further configured to receive the advertisement information from the information processing device and output the advertisement information to a predetermined display device in the vehicle.

In the information processing system of the third aspect, the information processing device may be configured to, when the vehicle is traveling in the area, extract the facility located within the predetermined range based on the location information, the predetermined range being a range located within a predetermined distance from a current location of the vehicle.

In the information processing system of the third aspect, the traffic capacity may be determined based on at least one of a width of the first road, the number of lanes of the first road, and a measured number of vehicles that pass a given point on the first road per unit time.

In the information processing system of the third aspect, the information processing device may include a road information database that stores identification information of the first road and identification information of the facility in association with each other.

In the information processing system of the third aspect, the facility that faces the first road may include a facility having an entrance or a front door located on a first road side.

A fourth aspect of the disclosure provides an advertisement distribution method. The advertisement distribution method includes: receiving location information indicating a location of a vehicle from an on-board device mounted on the vehicle; when the vehicle is traveling in an area that the vehicle has visited a predetermined number of times or less, extracting a facility that faces a first road located within a predetermined range based on the location information and having traffic capacity equal to or larger than a predetermined threshold; and sending advertisement information of the facility to the on-board device.

In the advertisement distribution method of the fourth aspect, extracting, when the vehicle is traveling in the area that the vehicle has visited the predetermined number of times or less, the facility that faces the first road located within the predetermined range based on the location information and having the traffic capacity equal to or larger than the predetermined threshold may include extracting, when the vehicle is traveling in the area, the facility located within the predetermined range based on the location information, the predetermined range being a range located within a predetermined distance from a current location of the vehicle.

In the advertisement distribution method of the fourth aspect, the traffic capacity may be determined based on at least one of a width of the first road, the number of lanes of the first road, and a measured number of vehicles that pass a given point on the first road per unit time.

The advertisement distribution method of the fourth aspect may further include: storing identification information of the first road and identification information of the facility in association with each other.

In the advertisement distribution method of the fourth aspect, the facility that faces the first road may include a facility having an entrance or a front door located on a first road side.

According to the above aspects, such an advertisement that can more efficiently prompt a user to make a decision can be distributed to the user who is visiting an unfamiliar area.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a diagram illustrating an example of information stored in a road information database (DB);

FIG. 6 is an example of a flowchart of a process that is performed by the on-board device; and FIG. 7 is an example of a flowchart of a process that is performed by the center server.

DETAILED DESCRIPTION OF EMBODIMENTS

Figure 1:
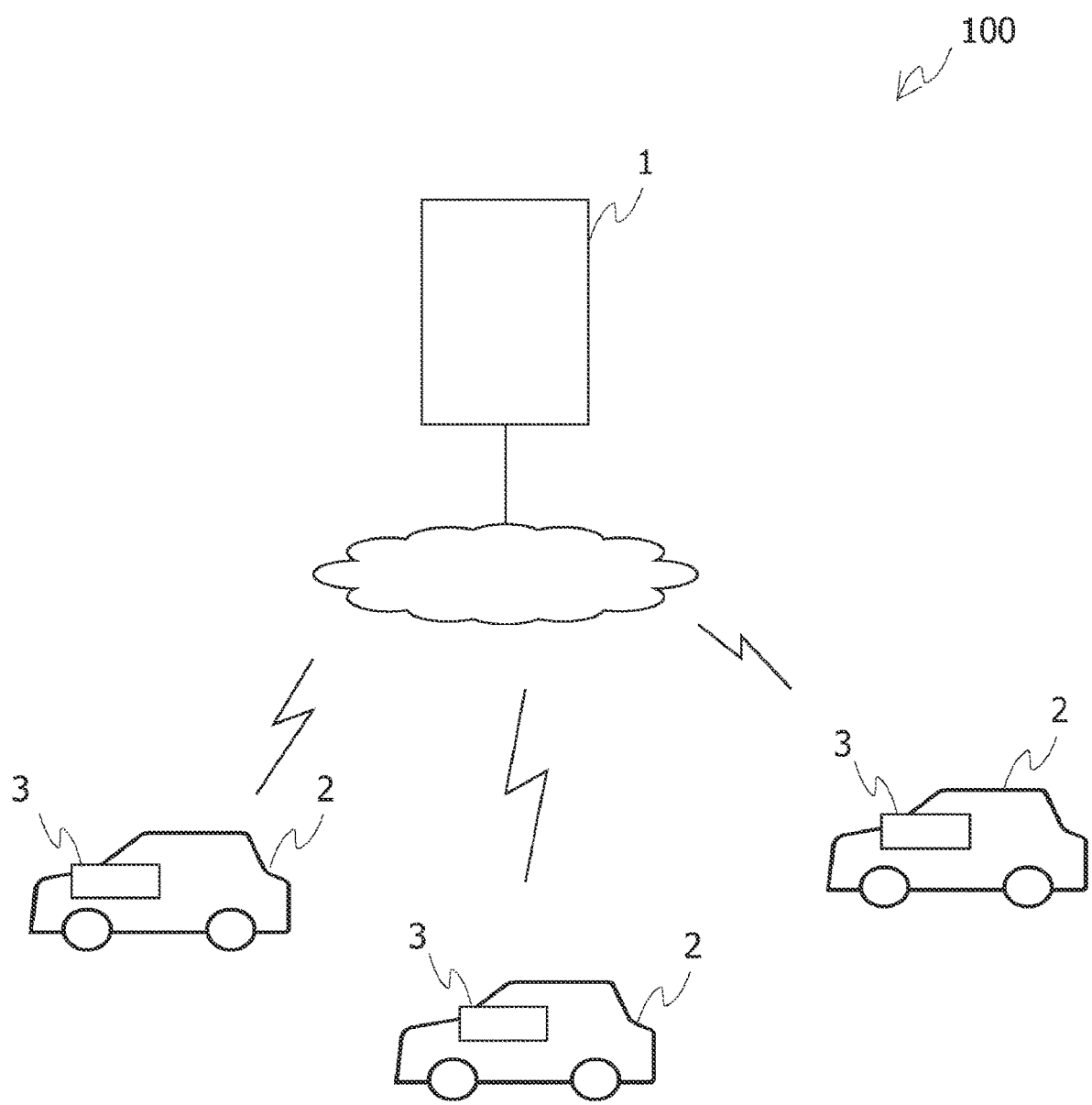
FIG. 1 is a diagram illustrating an example of a system configuration of an advertisement distribution system according to a first embodiment.

The first aspect of the disclosure provides an information processing device. The information processing device includes: a server transmitting and receiving unit configured to receive location information indicating a location of a vehicle from an on-board device mounted on the vehicle; and a server control unit configured to when the vehicle is traveling in an area that the vehicle has visited a predetermined number of times or less, extract a facility that faces a first road located within a predetermined range based on the location information and having traffic capacity equal to or larger than a predetermined threshold, wherein the server transmitting and receiving unit is configured to send advertisement information of the facility to the on-board device.

The second aspect of the disclosure provides an on-board device mounted on a vehicle. The on-board device includes: a control unit configured to obtain location information indicating a location of the vehicle; and a transmitting and receiving unit configured to when, based on the location information, the vehicle is traveling in an area that the vehicle has visited a predetermined number of times or less, send the location information to a predetermined information processing device, and receive, from the predetermined information processing device, advertisement information of a facility that faces a first road located within a predetermined range based on the location information and having traffic capacity equal to or larger than a predetermined threshold, wherein the control unit is configured to output the advertisement information to a predetermined display device in the vehicle.

The facility is, e.g., a store, a government office, an art museum, a museum, a park, etc. The predetermined range based on the location information is, e.g., a range located within a predetermined distance from the location of the vehicle, a range located within the limit of a municipality including the location of the vehicle or within a block or a lot (area indicated by a street number) which includes the location of the vehicle, or parts of these ranges which are located ahead in the traveling direction of the vehicle. For example, the predetermined range based on the location information may be the same range as that of the area where the vehicle is traveling.

The traffic capacity is the structural ability of a road indicating how much volume the road can accommodate.

For example, the traffic capacity is determined based on at least one of the road width, the number of lanes, actual measured traffic volume, etc.

The area that the vehicle has visited a predetermined number of times or less is an area that is not familiar to the occupant of the vehicle. The area that is not familiar to the occupant of the vehicle is, e.g., an area to which the occupant of the vehicle has just moved, an area where the occupant of the vehicle is traveling, etc. When the vehicle travels in an unfamiliar area, the vehicle is likely to first take the first road with large traffic capacity. Accordingly, information on facilities facing the first road with large traffic capacity is likely to be more valuable to the occupant of the vehicle traveling in the unfamiliar area than information on facilities facing what is called minor roads.

According to one of the aspects of the disclosure, when the vehicle is traveling in an area that the vehicle has visited the predetermined number of times or less, advertisement information of a facility that faces the first road having traffic capacity equal to or larger than the predetermined threshold is sent to the on-board device mounted on the vehicle. Advertisement information that is likely to be desired by the occupant of the vehicle can be provided to the occupant of the vehicle, and the occupant of the vehicle can be efficiently prompted to decide what to do in the area.

Embodiments will be described below with reference to the accompanying drawings. The configurations of the following embodiments are by way of illustration only, and the disclosure is not limited to the configurations of the embodiments.

First Embodiment

FIG. 1 is a diagram illustrating an example of a system configuration of an advertisement distribution system 100 according to a first embodiment. The advertisement distribution system 100 is a system that, for example, when a vehicle travels in an area that the vehicle has visited a predetermined number of times or less, distributes information on a store that faces a road located in the area and having traffic capacity equal to or larger than a predetermined threshold to the vehicle. The advertisement distribution system 100 includes, e.g., a center server 1 and on-board devices 3 mounted on a plurality of vehicles 2.

The vehicle 2 may be, e.g., either a manually driven vehicle or an autonomous vehicle. The on-board device 3 may be, e.g., any of a data communication device, an on-board device for a car navigation system, and when the vehicle 2 is an autonomous vehicle, a control device that controls autonomous driving. The on-board device 3 connects to, e.g., a public network such as the Internet by using either mobile communication such as Long Term Evolution (LTE) or 3G or narrowband communication such as dedicated short range communications (DSRC).

The center server 1 connects to, e.g., a network such as the Internet. The center server 1 and each on-board device 3 can communicate with each other via the network.

Figure 2:
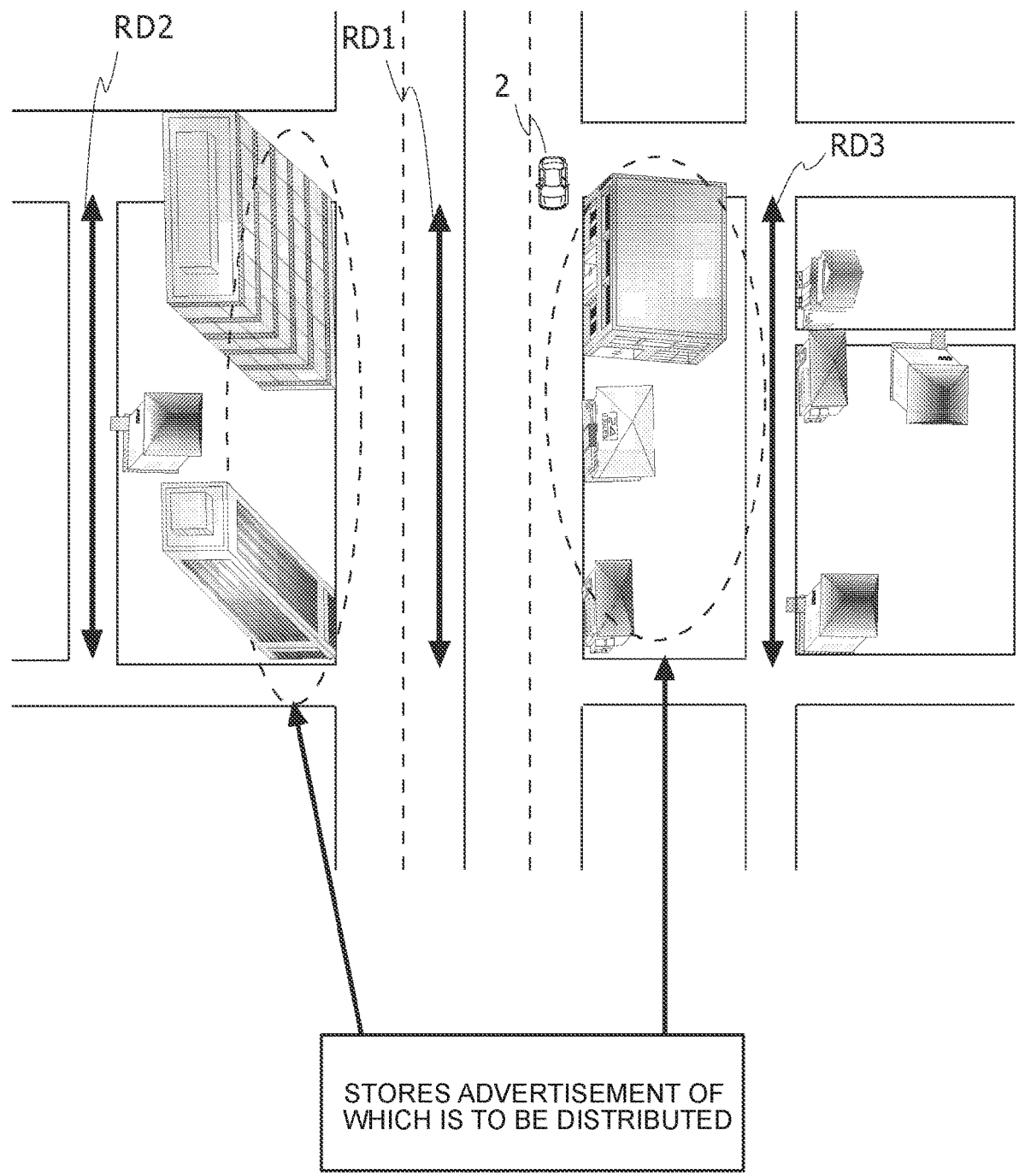
FIG. 2 is a diagram illustrating an example of the relationship between a store advertisement of which is to be distributed to a vehicle and a road in the advertisement distribution system according to the first embodiment.

FIG. 2 is a diagram illustrating an example of the relationship between a store advertisement of which is to be distributed to the vehicle 2 and a road in the advertisement distribution system 100 according to the first embodiment. In the first embodiment, the store advertisement of which is to be distributed to the vehicle 2 is a store facing a first road with traffic capacity equal to or larger than a predetermined threshold. The traffic capacity is determined based on, e.g., at least one of the road width, the number of lanes, the measured number of vehicles that pass a given point on the road per unit time, etc. For example, when the traffic capacity is the road width, the predetermined threshold is a predetermined length. When the traffic capacity is the number of lanes, the predetermined threshold is a predetermined number of lanes. When the traffic capacity is the measured number of vehicles that pass a given point on the road per unit time, the predetermined threshold is a predetermined number of vehicles. In the first embodiment, the first road is a road with large traffic capacity which is called a main road, a main street, a major road, etc.

For example, it is assumed in the example shown in FIG. 2 that the number of lanes is used as the traffic capacity and the predetermined threshold, namely the threshold of the number of lanes, is two. In this case, although the area shown in FIG. 2 includes roads RD1, RD2, RD3, roads RD2, RD3 having one lane are not regarded as the first road, and road RD1 having four lanes is regarded as the first road. In FIG. 2, each road RD1, RD2, RD3 is the road in the range shown by a double arrow line.

In the first embodiment, the on-board device 3 obtains location information of the vehicle 2 at predetermined intervals. The on-board device 3 stores history information of the location information in the most recent predetermined period. The on-board device 3 obtains from the location information and the history information of the vehicle 2 the number of times the vehicle 2 has visited an area where the vehicle 2 is currently traveling (the number of past visits to the area), and when the number of past visits to the area is equal to or less than a predetermined value, sends an advertisement request, namely a request for advertisement information, to the center server 1. The on-board device 3 sends the location information of the vehicle 2 as well as the advertisement request to the center server 1. The area herein refers to, e.g., the area within the limit of a municipality or a predetermined area that is set in advance.

The center server 1 stores, e.g., roads regarded as the first road and information on stores facing the roads. When the center server 1 receives the advertisement request and the location information of the vehicle 2 from the on-board device 3, the center server 1 specifies an extraction target range based on the location information of the vehicle 2. The extraction target range is a range from which a store advertisement information of which is to be sent to the vehicle 2 is extracted. For example, the extraction target range is a range located within a predetermined distance from the current location of the vehicle 2, the same block or the same lot (area indicated by a street number) as that of the current location of the vehicle 2, and/or a block or lot located around the block or lot of the current location of the vehicle 2. The extraction target range is an example of the "predetermined range based on the location information."

For example, the center server 1 extracts the first road included in the extraction target range and specifies a store facing the extracted first road. For example, in the example shown in FIG. 2, stores in the ranges each surrounded by a dotted line are specified as stores advertisement information of which is to be distributed to the vehicle 2. The center server 1 sends the advertisement information of the specified stores to the on-board device 3. The on-board device 3 outputs the advertisement information received from the center server 1 to a display device in the vehicle 2.

In the first embodiment, when the vehicle 2 is traveling in an area that the vehicle 2 has visited a predetermined number of times or less, advertisement information of a store facing the first road called a "main road," a "major road," etc. in the extraction target range is distributed to the vehicle 2. When the vehicle 2 travels in an area that the vehicle 2 has visited a small number of times, the vehicle 2 is likely to first take roads with large traffic capacity, namely the first road. An occupant of the vehicle 2 is therefore likely to notice a store facing the first road while the vehicle 2 is traveling on the first road. Since advertisement information of the store facing the first road is distributed to the vehicle 2 in such a situation, the occupant of the vehicle 2 can more efficiently decide which store to visit. Moreover, distributing the advertisement information of the store attracts more interest in the store from the occupant of the vehicle 2 and thus improves advertisement effectiveness.

In the first embodiment, when the vehicle 2 is traveling in an area that the vehicle 2 has visited the predetermined number of times or less, advertisement information on a store facing the first road in the extraction target range is distributed to the vehicle 2, but advertisement information on stores facing roads other than the first road in the extraction target range will not be distributed to the vehicle 2. The roads other than the first road are, e.g., roads with small traffic capacity called a "minor road," a "back street," etc. If advertisement information on a store facing a "minor road" is also distributed to the vehicle 2 when the vehicle 2 is traveling in an area that the vehicle 2 has visited a small number of times, the occupant of the vehicle 2 may not be interested in the advertisement information on the store. Moreover, the overall amount of advertisement information that is distributed to the vehicle 2 is increased, which may bother the occupant of the vehicle 2. In the present embodiment, when the vehicle 2 is traveling in an area that the vehicle 2 has visited the predetermined number of times or less, advertisement information on stores facing roads other than the first road in the extraction target range will not be distributed to the vehicle 2. This restrains the occupant of the vehicle 2 from being bothered by the advertisement information.

Figure 3:
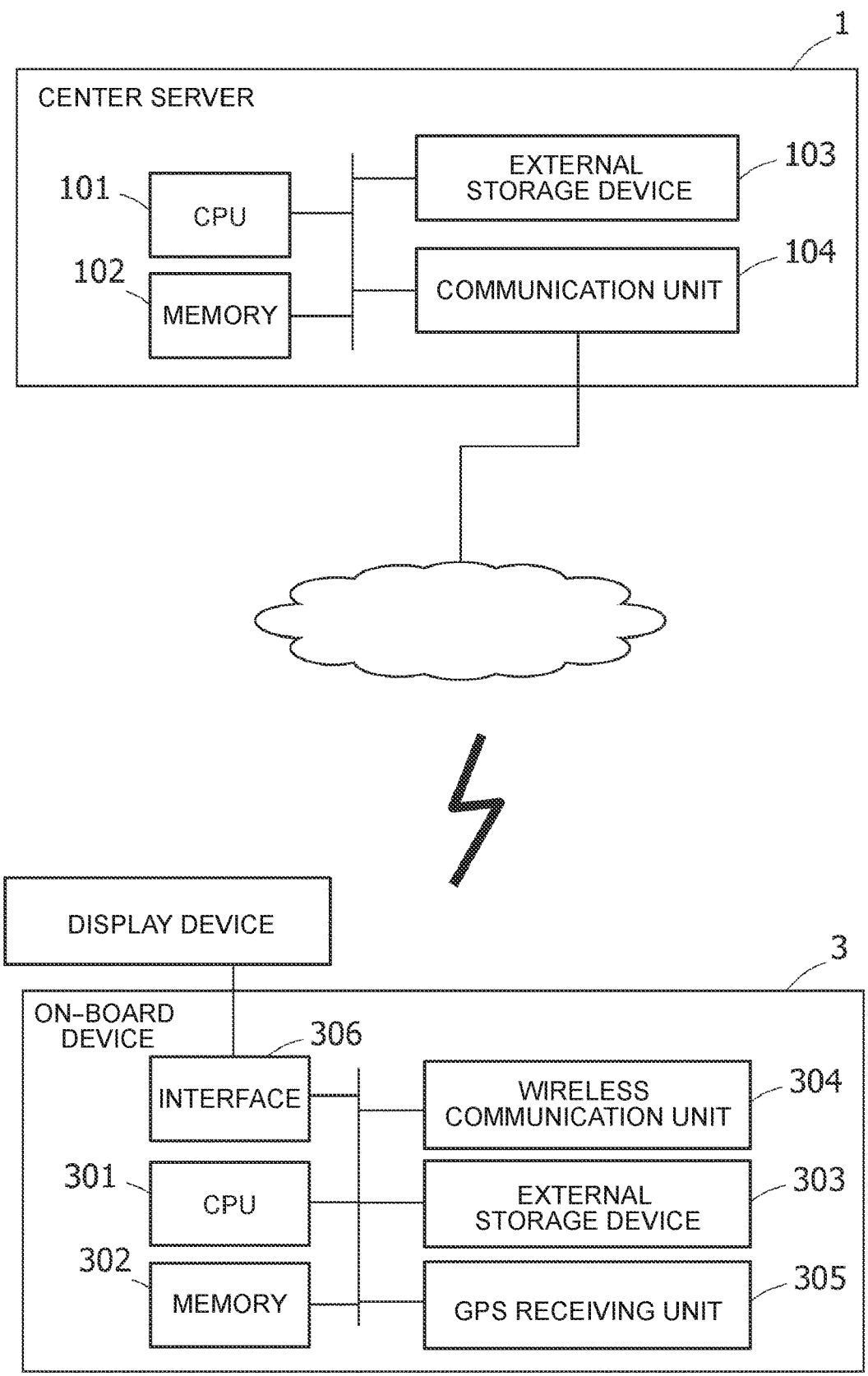
FIG. 3 is a diagram illustrating an example of hardware configurations of a center server and an on-board device in the advertisement distribution system.

FIG. 3 is a diagram illustrating an example of hardware configurations of the center server 1 and the on-board device 3 in the advertisement distribution system 100. The center server 1 is, e.g., a dedicated computer or a general-purpose computer. The center server 1 includes, as hardware configurations, a central processing unit (CPU) 101, a memory 102, an external storage device 103, and a communication unit 104. The memory 102 and the external storage device 103 are computer-readable recording media. The center server 1 is an example of the "information processing device."

The external storage device 103 stores various programs and data to be used by the CPU 101 when executing each program. The external storage device 103 is, e.g., an erasable programmable read only memory (EPROM) or a hard disk drive (HDD). The programs that are stored in the external storage device 103 include, e.g., an operating system (OS), a control program for the advertisement distribution system 100, and various other application programs. The control program for the advertisement distribution system 100 is a program for distributing advertisement information of a store facing the first road located around the current location of the vehicle to the vehicle.

The memory 102 is a storage device that provides the CPU 101 with a storage area and a work area to which the programs stored in the external storage device 103 are loaded and that is used as a buffer. The memory 102 includes, e.g., a semiconductor memory such as a read only memory (ROM) or a random access memory (RAM).

The CPU 101 performs various processes by loading the OS and various application programs stored in the external storage device 103 to the memory 102 and executing them. The number of CPUs 101 is not limited to one, and the center server 1 may include a plurality of CPUs 101. The CPU 101 is an example of the "server control unit" of the "information processing device."

The communication unit 104 is an interface that inputs and outputs information to and from a network. The communication unit 104 may be either an interface that connects to a wired network or an interface that connects to a wireless network. The communication unit 104 is, e.g., a network interface card (NIC), a radio circuit, etc. The communication unit 104 connects to, e.g., a local area network (LAN), connects to a public network through the LAN, and communicates with various servers on the network and the on-board devices 3 through the public communication network.

The on-board device 3 is, e.g., a data communication device, a car navigation system, or an electronic toll collection (ETC) on-board unit which is mounted on the vehicle 2. When the vehicle 2 is an autonomous vehicle, the on-board device 3 may be an autonomous driving control device having a communication function to connect to a public network such as the Internet. However, the on-board device 3 is not limited to these. In the following description of the first embodiment, it is assumed that the on-board device 3 is a data communication device.

The on-board device 3 includes, as hardware components, a CPU 301, a memory 302, an external storage device 303, a wireless communication unit 304, a Global Positioning System (GPS) receiving unit 305, and an interface 306. The CPU 301, the memory 302, and the external storage device 303 are similar to the CPU 101, the memory 102, and the external storage device 103. However, the external storage device 303 of the on-board device 3 stores, e.g., a control program for the on-board device 3 of the advertisement distribution system 100. The control program for the on-board device 3 of the advertisement distribution system 100 is, e.g., a program for obtaining advertisement information from the center server 1. The CPU 301 is an example of the "control unit" of the "on-board device."

The wireless communication unit 304 is, e.g., a wireless communication circuit using mobile communication such as LTE, LTE-Advanced, or 3G, Wi-Fi, DSRC, etc. The wireless communication unit 304 connects to an access network according to a corresponding wireless communication method by wireless communication, connects to a public network through the access network, and connects to the center server 1 etc. through the public network.

The GPS receiving unit 305 receives radio waves of time signals from a plurality of artificial satellites orbiting the Earth and stores them in a register in the CPU 301. For example, the CPU 301 calculates the latitude and longitude, namely the location on the Earth, based on detection signals from the GPS receiving unit 305 to obtain location information of the vehicle 2 (the on-board device 3).

The interface 306 is, e.g., an interface that is connected to the display device in the vehicle 2. The interface 306 may be directly connected to the display device in the vehicle 2 by a cable etc., or may be connected to an on-board network (Controller Area Network (CAN)) and connected to the display device in the vehicle 2 through the CAN. For example, the display device in the vehicle 2 which is connected to the on-board device 3 may be one or more of a display device of the car navigation system, a display device mounted so as to face the rear seat(s), etc.

The hardware configurations of the center server 1 and the on-board device 3 shown in FIG. 3 are by way of illustration and are not limited to the above hard configurations. Components may be omitted, replaced, or added as appropriate according to the embodiment. For example, the center server 1 may include a portable recording medium drive device and may execute a program recorded on a portable recording medium. The portable recording medium is, e.g., a recording medium such as a secure digital (SD) card, a mini SD card, a micro SD card, a universal serial bus (USB) flash memory, a compact disc (CD), a digital versatile disc (DVD), a Blu-ray (registered trademark) disc, or a flash memory card. For example, the center server 1 may include an input device and an output device. The input device is, e.g., a keyboard, a mouse, a touch panel, etc. The output device is, e.g., a display etc.

A series of processes that is performed by the center server 1 and the on-board device 3 need not necessarily be achieved by executing software by a processor and may be achieved by, e.g., hardware such as an field-programmable gate array (FPGA).

Figure 4:
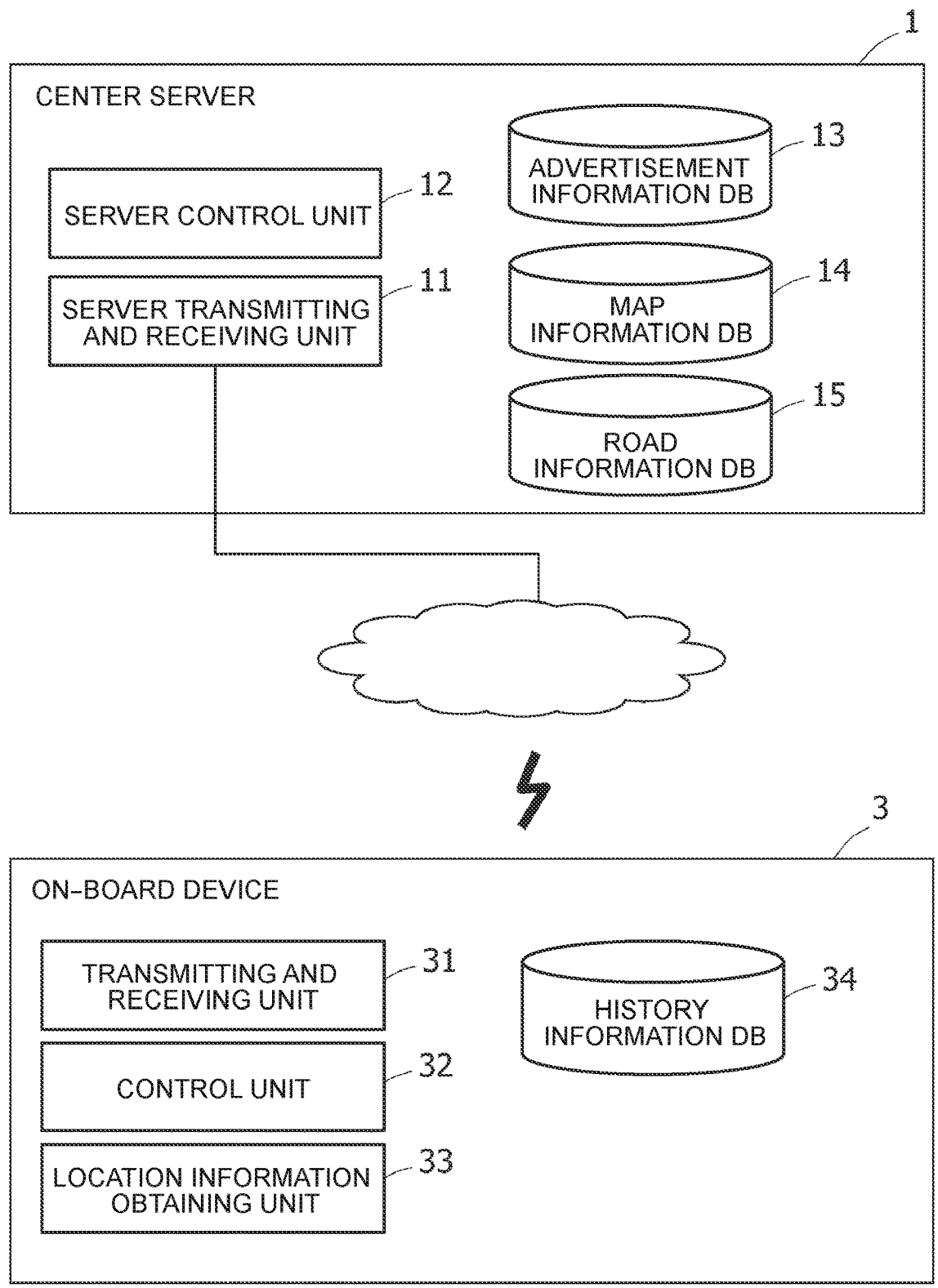
FIG. 4 is a diagram illustrating an example of functional configurations of the center server and the on-board device in the advertisement distribution system.

FIG. 4 is a diagram illustrating an example of functional configurations of the center server 1 and the on-board device 3 in the advertisement distribution system 100. The on-board device 3 includes, as functional components, a transmitting and receiving unit 31, a control unit 32, a location information obtaining unit 33, and a history information database (DB) 34. For example, these functional components are achieved by the CPU 301 of the on-board device 3 executing the control program for the on-board device 3 of the advertisement distribution system 100 which is stored in the external storage device 303.

The transmitting and receiving unit 31 is an interface for communication with the network which is made through the wireless communication unit 304. For example, the transmitting and receiving unit 31 receives an advertisement request from the control unit 32 and sends the advertisement request to the center server 1 through the wireless communication unit 304. The transmitting and receiving unit 31 receives through the wireless communication unit 304 advertisement information sent from the center server 1 in response to the advertisement request and outputs the advertisement information to the control unit 32.

For example, the location information obtaining unit 33 obtains at predetermined intervals the location information of the vehicle 2 (the on-board device 3) obtained by the GPS receiving unit 305 of the on-board device 3 and outputs the obtained location information to the control unit 32. An example of the location information of the vehicle 2 is latitude and longitude. Another example of the location information of the vehicle 2 is an address. For example, the intervals at which the location information obtaining unit 33 obtains the location information may be set in the range of 0.1 to 10 seconds. However, the disclosure is not limited to this.

For example, the history information DB 34 is created in a storage area of the external storage device 303 of the on-board device 3. For example, history information of the location information in the most recent predetermined period is stored in the history information DB 34. Specifically, the location information and the time the location information was obtained are stored as the history information in the history information DB 34 in the order that the location information was obtained. The intervals at which the location information is registered in the history information DB 34 may be longer than those at which the location information obtaining unit 33 obtains the location information. For example, the intervals at which the location information is registered in the history information DB 34 may be set as desired in the range of 1 to 10 minutes. However, the disclosure is not limited to this. For example, the location information, the time the location information was obtained, and identification information of an area including the location indicated by the location information may be stored in association with each other in the history information DB 34. For example, the area may be a municipality, a block or a lot (area indicated by a street number), or an area uniquely set by the advertisement distribution system 100.

The control unit 32 obtains the location information from the location information obtaining unit 33 at predetermined intervals and stores, e.g., the location information and the time the location information was obtained in association with each other in the history information DB 34. The intervals at which the control unit 32 obtains the location information from the location information obtaining unit 33 is the same as those at which the location information is registered in the history information DB 34.

The control unit 32 determines whether or not the number of times the vehicle 2 has visited an area where the vehicle 2 is currently traveling (the number of past visits to the area) is equal to or less than a predetermined value, based on the location information obtained from the location information obtaining unit 33 and the history information of the location information stored in the history information DB 34. For example, the predetermined value, namely the number of past visits to the area which serves as a threshold for this determination, may be set as desired in the range of 1 to 10. However, the disclosure is not limited to this. The current visit may be included in the number of past visits. For example, in the case where a plurality of pieces of location information indicating the same area are successively registered as history information in the history information DB 34, the number of past visits to the area may be regarded as one.

When the control unit 32 determines that the number of past visits to the area is equal to or less than the predetermined value, the control unit 32 outputs an advertisement request to the transmitting and receiving unit 31, and the transmitting and receiving unit 31 sends the advertisement request to the center server 1. This is because, when it is determined that the number of past visits to the area is equal to or less than the predetermined value, it is determined that the occupant of the vehicle 2 is not familiar with this area. When the control unit 32 determines that the number of past visits to the area is larger than the predetermined value, the control unit 32 does not send an advertisement request to the center server 1.

The control unit 32 sends the location information of the vehicle 2 as well as the advertisement request to the center server 1. The location information of the vehicle 2 which is sent together with the advertisement request may be, e.g., the latest location information obtained by the location information obtaining unit 33 or the location information used in the above determination. The location information of the vehicle 2 which is sent together with the advertisement request may be a single piece of location information or a plurality of successive pieces of location information.

When the control unit 32 receives advertisement information from the center server 1 through the transmitting and receiving unit 31, the control unit 32 outputs the advertisement information to the display device in the vehicle 2. When the advertisement information contains audio data, the control unit 32 may output the audio data to a speaker in the vehicle 2.

The center server 1 includes, as functional components, a server transmitting and receiving unit 11, a server control unit 12, an advertisement information database (DB) 13, a map information database (DB) 14, and a road information database (DB) 15. For example, these functional components are achieved by the CPU 101 of the center server 1 executing a control program for the center server 1 of the advertisement distribution system 100 which is stored in the external storage device 103.

The server transmitting and receiving unit 11 controls communication with the on-board device 3 which is made through the communication unit 104. For example, when the server transmitting and receiving unit 11 receives an advertisement request and location information from the on-board device 3, the server transmitting and receiving unit 11 outputs the advertisement request and the location information to the server control unit 12. For example, when the server transmitting and receiving unit 11 receives advertisement information from the server control unit 12, the server transmitting and receiving unit 11 sends the advertisement information to the on-board device 3.

The server control unit 12 receives an advertisement request and location information from the on-board device 3 through the server transmitting and receiving unit 11. The server control unit 12 specifies an extraction target range, namely a range from which a store advertisement information of which is to be sent to the on-board device 3 is extracted, based on the received location information and the map information DB 14 described below. For example, the extraction target range may be any of: a range located within a predetermined distance from the location of the vehicle 2 indicated by the received location information; a municipality, a block, or a lot (area indicated by a street number) which includes the location of the vehicle 2 indicated by the received location information; and an area uniquely set by the advertisement distribution system 100. When the server control unit 12 receives a plurality of pieces of location information from the on-board device 3, the server control unit 12 can specify the traveling direction of the vehicle 2. In this case, the extraction target range may be limited to a range located ahead in the traveling direction of the vehicle 2. When the extraction target range is a range located within a predetermined distance from the location of the vehicle 2, the range may have any shape such as a circle, an ellipse, a semicircle, or a rectangle.

The server control unit 12 extracts, based on the map information DB 14 and the road information DB 15 described below, the first road with large traffic capacity from the roads in the extraction target range and specifies a store facing the extracted first road. The server control unit 12 then obtains advertisement information of the store facing the first road included in the extraction target range from the advertisement information DB 13 described below. The server control unit 12 outputs the obtained advertisement information to the server transmitting and receiving unit 11 to send the advertisement information to the on-board device 3.

The advertisement information DB 13, the map information DB 14, and the road information DB 15 are created in a storage area of the external storage device 103 of the center server 1. Advertisement information is stored in association with identification information and advertisement identification information of a store in the advertisement information DB 13. The advertisement information is, e.g., a file such as a still image or a video. The advertisement information may contain audio data.

Map information is stored in the map information DB 14. In the map information, each road has identification information. Which segment of a road (from where to where) is defined as a road is not limited to a specific definition. For example, like roads RD1, RD2, RD3 shown in FIG. 2, a segment from one intersection to the next may be defined as a road. Alternatively, a road may be defined according to the definition established by a third-party organization such as a land value map created by the National Tax Agency.

FIG. 5 is a diagram illustrating an example of information stored in the road information DB 15. A road determined in advance to be the first road and advertisement information of a store facing this road are stored in association with each other in the road information DB 15. Specifically, identification information (road ID) of a road regarded as the first road and identification information (store ID) of a store facing this road are stored in association with each other in the road information DB 15. For example, when the server control unit 12 of the center server 1 specifies an extraction target range based on the map information DB 14, the server control unit 12 detects a road included in the extraction target range and contained in the road information DB 15 as the first road.

The store facing the road refers to, e.g., a store having an entrance or a front door located on the road side. When the store has a plurality of entrances, the store is associated with the road based on, e.g., the main entrance of the store. That is, in the first embodiment, each store is associated with a single road.

In FIG. 5, identification information of a road and identification information of a store are associated with each other. However, the disclosure is not limited to this. For example, identification information of a road and identification information of advertisement information of a store may be associated with each other. In this case, the server control unit 12 extracting a store that faces the first road included in the extraction target range is synonymous with the server control unit 12 extracting advertisement identification information associated with the first road included in the extraction target range.

The advertisement information DB 13, the map information DB 14, and the road information DB 15 are registered in advance and may be updated, e.g., at predetermined intervals, upon occurrence of a predetermined event, etc. For example, the event that causes the advertisement information DB 13 to be updated is addition, deletion, update, etc. of advertisement information. For example, the road information DB 15 is updated accordingly when the map information DB 14 is updated and/or the advertisement information DB 13 is updated.

The functional configurations of the center server 1 and the on-board device 3 shown in FIG. 4 are by way of illustration, and these functional configurations are not limited to those shown in FIG. 4.

Process Flow

FIG. 6 is an example of a flowchart of a process that is performed by the on-board device 3. For example, the process shown in FIG. 6 is repeatedly performed at the same intervals as those at which location information is registered in the history information DB 34. Although the process shown in FIG. 6 is mainly performed by the CPU 301 of the on-board device 3, the process is herein described as being mainly performed by the functional components for convenience.

In OP101, the control unit 32 obtains location information of the vehicle 2 from the location information obtaining unit 33. The control unit 32 registers the obtained location information in the history information DB 34.

In OP102, the control unit 32 specifies from the obtained location information an area where the vehicle 2 is currently traveling and determines whether the number of times the vehicle 2 has visited the area (the number of past visits to the area) is equal to or less than a predetermined value. When the number of past visits to the area is equal to or less than the predetermined value (OP102: YES), the process proceeds to OP103. When the number of past visits to the area is larger than the predetermined value (OP102: NO), the process shown in FIG. 6 is terminated.

In OP103, the control unit 32 sends an advertisement request and the location information to the center server 1 through the transmitting and receiving unit 31.

In OP104, the control unit 32 determines whether it has received advertisement information from the center server 1 through the transmitting and receiving unit 31. When the control unit 32 has received advertisement information from the center server 1 (OP104: YES), the process proceeds to OP105. In OP105, the control unit 32 outputs the received advertisement information to the display device in the vehicle 2. The process shown in FIG. 6 is then terminated.

For example, when the control unit 32 has not received advertisement information from the center server 1 for a predetermined time after transmission of the advertisement request (OP104: NO), the process shown in FIG. 6 is terminated. The process of FIG. 6 which is performed by the on-board device 3 is by way of illustration, and the disclosure is not limited to this.

FIG. 7 is an example of a flowchart of a process that is performed by the center server 1. For example, the process shown in FIG. 7 is repeatedly performed at predetermined intervals. Although the process shown in FIG. 7 is mainly performed by the CPU 101 of the center server 1, the process is herein described as being mainly performed by the functional components for convenience. It is assumed that the road information DB 15 storing the information shown in FIG. 5 is used in the process shown in FIG. 7.

In OP201, the server control unit 12 determines whether it has received an advertisement request from the on-board device 3. When the server control unit 12 has received an advertisement request (OP201: YES), the process proceeds to OP202. When the server control unit 12 has not received an advertisement request (OP201: NO), the process shown in FIG. 7 is terminated. For example, the server control unit 12 receives location information of the vehicle 2 together with the advertisement request.

In OP202, the server control unit 12 specifies, based on the location information of the vehicle 2, an extraction target range from which a store advertisement information of which is to be sent to the on-board device 3 is extracted, by using the map information DB 14. In OP203, the server control unit 12 extracts a road included in the specified extraction target range and regarded as the first road, based on the map information DB 14 and the road information DB 15.

In OP204, the server control unit 12 extracts, based on the road information DB 15, a store associated with the road regarded as the first road, namely the road extracted in OP203. In OP205, the server control unit 12 obtains advertisement information of the store extracted in OP204 from the advertisement information DB 13. In OP206, the server control unit 12 sends the advertisement information obtained in OP205 to the on-board device 3 through the server transmitting and receiving unit 11. The process shown in FIG. 7 is then terminated. The processes of FIGS. 6 and 7 which are performed by the on-board device 3 and the center server 1 are by way of illustration, and the disclosure is not limited to these. For example, the process of FIG. 7 which is performed by the center server 1 is changed as appropriate according to what kind of information is stored in the advertisement information DB 13 and the road information DB 15 of the center server 1.

Functions and Effects of First Embodiment

In the first embodiment, when the number of times the vehicle 2 has visited an area where the vehicle 2 is traveling (the number of past visits to the area) is equal to or less than the predetermined value, advertisement information of a store facing the first road with relatively large traffic capacity which is a road called a "main road" or a "major road" is sent to the on-board device 3. For example, when the vehicle 2 travels in an unfamiliar area such as an area to which an occupant of the vehicle 2 has moved or an area where he or she is traveling, the vehicle 2 is likely to first take roads such as the first road. In such a situation, advertisement information of stores facing the first road is distributed to the vehicle 2, but advertisement information of stores facing roads called "minor roads" will not be distributed. Accordingly, advertisement information to be provided to the occupant of the vehicle 2 can be limited. Namely, the occupant of the vehicle 2 can have a limited number of choices of stores to visit, so that he or she can more efficiently make a decision. Moreover, the advertisement information to be distributed to the vehicle 2 is limited to the advertisement information of stores facing the first road. This restrains the occupant of the vehicle 2 from being bothered by the advertisement information.

Other Embodiments

The above embodiment is by way of illustration, and modifications can be made as appropriate without departing from the scope of the disclosure.

In the first embodiment, advertisement information of any store facing the first road in the extraction target range is sent to the on-board device 3. However, the disclosure is not limited to this. For example, user's preferences may be registered in association with the on-board device 3, and advertisement information of only the store(s) that suits the user's preferences may be distributed to the on-board device 3 out of advertisement information of the stores facing the first road in the extraction target range. In this case, the center server 1 may store identification information of each user and the types of stores each user wishes to receive advertisements of. The types of stores are, e.g., restaurants, clothing stores, variety stores, etc. In this case, the on-board device 3 may send user identification information as well as an advertisement request to the center server 1.

The first embodiment is described with respect to distribution of advertisement information of stores. However, the information that is distributed is not limited to the advertisement information of stores. For example, information on facilities such as government offices, parks, art museums, and museums may be distributed. Many of such facilities face the first road, and therefore useful information can be provided to the occupant of the vehicle 2 who is not familiar with the area.

In the first embodiment, as shown in FIG. 5, roads regarded as the first road and stores facing these roads are stored in association with each other in the road information DB 15. However, the information that is stored in the road information DB 15 is not limited to this. For example, identification information of stores facing the first road and location information of these stores may be stored in association with each other in the road information DB 15.

In the first embodiment, roads regarded as the first road are extracted in advance, and information on these roads is stored in the road information DB 15. However, the disclosure is not limited to this. For example, the center server 1 may include a database that stores information on each road such as the road width, the number of lanes, and the measured number of vehicles that pass a given point on the road per predetermined unit time. Every time the center server 1 receives an advertisement request from the on-board device 3, the center server 1 may refer to this database and extract a road regarded as the first road from the roads in the extraction target range.

The processes and means described in the present disclosure can be combined as desired as long as no technical contradictions occurs.

The process described as being performed by a single device may be performed by a plurality of devices. The processes described as being performed by different devices may be performed by a single device. The hardware configuration (server configuration) that implements each function in a computer system can be flexibly changed.

The embodiments can also be implemented by providing a computer program having the functions described in the above embodiments to a computer and reading and executing the program by one or more processors included in the computer. Such a computer program may be provided to the computer by a non-transitory computer-readable storage medium that can be connected to a system bus of the computer or may be provided to the computer via a network. Examples of the non-transitory computer-readable storage medium include any types of disks or discs such as magnetic disks (floppy (registered trademark) disks, hard disk drives (HDDs), etc.) and optical discs (CD-ROMs, DVD discs, Blu-ray discs, etc.), read-only memories (ROMs), random access memories (RAMs), erasable programmable read-only memories (EPROMs), electrically erasable programmable read-only memories (EEPROMs), magnetic cards, flash memories, optical cards, and any types of media suitable for storing electronic instructions.

What is claimed is:

1. An information processing device, comprising one or more processors configured to:
   receive location information indicating a location of a vehicle from an on-board device mounted on the vehicle;
   determine whether the vehicle has visited an area less than a predetermined number of times; and
   based on the vehicle traveling in the area that the vehicle has visited less than the predetermined number of times:
      obtain traffic capacity information corresponding to a traffic capacity of a plurality of roads;
      extract a first road, from among the plurality of roads, located within a predetermined range based on the location information and having traffic capacity equal to or larger than a predetermined threshold based on the traffic capacity information,
      select, based on the extracting the first road, a facility facing the first road, the facility located within the predetermined range based on the location information, the predetermined range being a range located within a predetermined distance from a current location of the vehicle;
      send advertisement information of the facility to the on-board device.

2. The information processing device according to claim 1, wherein the traffic capacity is determined based on at least one of a width of the first road, the number of lanes of the first road, and a measured number of vehicles that pass a given point on the first road per unit time.

3. The information processing device according to claim 1, further comprising a road information database that stores identification information of the first road and identification information of the facility in association with each other.

4. The information processing device according to claim 1, wherein the facility that faces the first road includes a facility having an entrance or a front door located on a first road side.

5. An on-board device mounted on a vehicle, comprising:
   a one or more processors configured to:
      obtain location information indicating a location of the vehicle;
      determine whether the vehicle has visited an area less than a predetermined number of times;
      when, based on the location information, the vehicle is traveling in the area that the vehicle has visited less than the predetermined number of times, send the location information to a predetermined information processing device,
      receive, from the predetermined information processing device, advertisement information of a facility that faces a first road, extracted from among a plurality of roads, located within a predetermined range based on the location information and having traffic capacity equal to or larger than a predetermined threshold based on traffic capacity information corresponding to a traffic capacity of the plurality of roads, and output the advertisement information to a predetermined display device in the vehicle.

6. The on-board device according to claim 5, wherein the control unit is configured to receive the advertisement information of the facility located within the predetermined range based on the location information from the predetermined information processing device, the predetermined range being a range located within a predetermined distance from a current location of the vehicle.

7. The on-board device according to claim 5, wherein the traffic capacity is determined based on at least one of a width of the first road, the number of lanes of the first road, and a measured number of vehicles that pass a given point on the first road per unit time.

8. The on-board device according to claim 5, wherein the information processing device includes a road information database that stores identification information of the first road and identification information of the facility in association with each other.

9. The on-board device according to claim 5, wherein the facility that faces the first road includes a facility having an entrance or a front door located on a first road side.

10. An information processing system, comprising:
    an on-board device mounted on a vehicle configured to:
       obtain location information indicating a location of the vehicle,
       determine whether the vehicle has visited an area less than a predetermined number of times, and
       send the location information when, based on the location information, the vehicle is traveling in the area that the vehicle has visited less than the predetermined number of times; and
    an information processing device configured to:
       receive the location information indicating the location of the vehicle from the on-board device, obtain traffic capacity information corresponding to a traffic capacity of a plurality of roads, extract a first road, from among the plurality of roads, located within a predetermined range based on the location information and having traffic capacity equal to or larger than a predetermined threshold based on the traffic capacity information, select, based on the extracting the first road, a facility facing the first road, the facility located within the predetermined range based on the location information, the predetermined range being a range located within a predetermined distance from a current location of the vehicle, and send advertisement information of the facility to the on-board device, wherein the on-board device is further configured to:

receive the advertisement information from the information processing device, and output the advertisement information to a predetermined display device in the vehicle.

11. The information processing system according to claim 10, wherein the information processing device is configured to, when the vehicle is traveling in the area, extract the facility located within the predetermined range based on the location information, the predetermined range being a range located within a predetermined distance from a current location of the vehicle.

12. The information processing system according to claim 10, wherein the traffic capacity is determined based on at least one of a width of the first road, the number of lanes of the first road, and a measured number of vehicles that pass a given point on the first road per unit time.

13. The information processing system according to claim 10, wherein the information processing device includes a road information database that stores identification information of the first road and identification information of the facility in association with each other.

14. The information processing system according to claim 10, wherein the facility that faces the first road includes a facility having an entrance or a front door located on a first road side.

15. An advertisement distribution method, comprising:

receiving location information indicating a location of a vehicle from an on-board device mounted on the vehicle;

determining whether the vehicle has visited an area less than a predetermined number of times;

based on the vehicle traveling in the area that the vehicle has visited less than the predetermined number of times:

obtaining traffic capacity information corresponding to a traffic capacity of a plurality of roads;

extracting a first road, from among the plurality of roads, located within a predetermined range based on the location information and having traffic capacity equal to or larger than a predetermined threshold based on the traffic capacity information;

selecting, based on the extracting the first road, a facility facing the first road, the facility located within the predetermined range based on the location information, the predetermined range being a range located within a predetermined distance from a current location of the vehicle; and sending advertisement information of the facility to the on-board device.

16. The advertisement distribution method according to claim 15, wherein the traffic capacity is determined based on at least one of a width of the first road, the number of lanes of the first road, and a measured number of vehicles that pass a given point on the first road per unit time.

17. The advertisement distribution method according to claim 15, further comprising storing identification information of the first road and identification information of the facility in association with each other.

18. The advertisement distribution method according to claim 15, wherein the facility that faces the first road includes a facility having an entrance or a front door located on a first road side.

* * * * *